Sept. 16, 1958    W. GEHRIG    2,851,816
COMBINED FISHING WEIGHTS AND ASSEMBLY MEMBERS
Filed Oct. 21, 1953
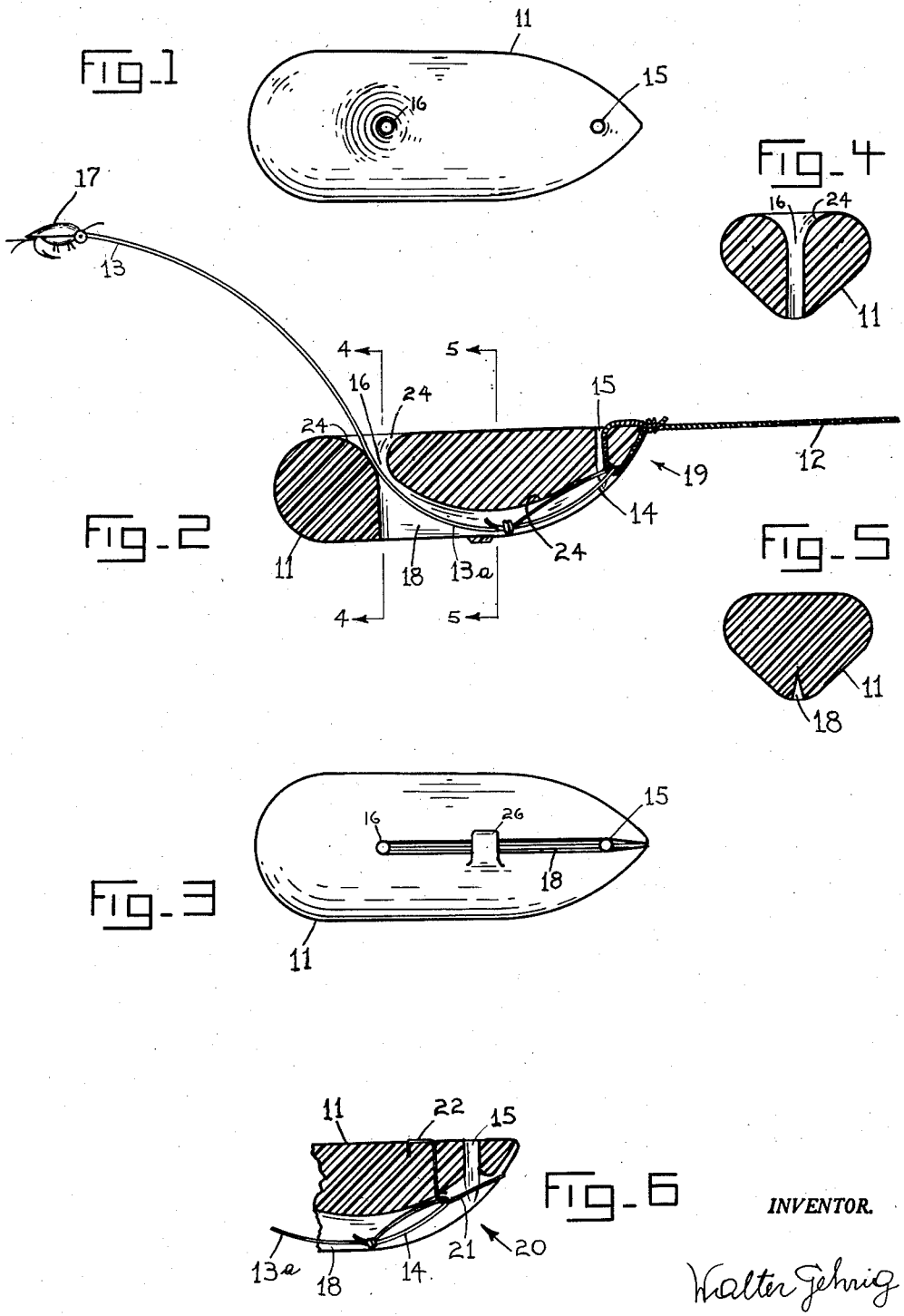
INVENTOR.
Walter Gehrig

United States Patent Office 2,851,816
Patented Sept. 16, 1958

2,851,816

COMBINED FISHING WEIGHTS AND ASSEMBLY MEMBERS

Walter Gehrig, Flint, Mich.

Application October 21, 1953, Serial No. 387,398

9 Claims. (Cl. 43—43.1)

This invention comprises improvements and modified forms of construction over the forms illustrated in my previous patent application filed May 3, 1949, Serial No. 91,032, now Patent No. 2,710,479, which reissued as Re. No. 24,247.

The present invention relates to casting weights, sinkers and bobbers used for fishing. It consists substantially of a body forming an assembly-member for neat and convenient assembly with a fishing line and with a flexible but wiry hookleader such as a snell. The body has adequate specific gravity to serve as a casting weight for casting small light lures with a casting rod and reel.

For casting small light-weight lures it is preferable to have a transparent fishing weight and assembly-body, which may consist of buoyant or of sinking material. A fishing weight of transparent plastic provides a body which floats or which sinks just below the surface of a body of water during slow retrieving. A body of heavier specific gravity, such as glass is better suited for retrieving a lure several feet below the water-surface. A lead sinker in the form of the hereafter described assembly body provides an improved sinker for trolling and still fishing.

The object of the invention is to provide a combined fishing weight and assembly member which has simple and convenient means to neatly assemble a hookleader and a fishing line on the body thereof.

A feature of the described invention is that a "dry" fly or floating lure can be fished on the surface of the water while the connected fishing weight travels below the water-surface and thus the fishing weight does not cause a tell-tale ripple on the lake-surface as do high floating "bubbles" used today for spin-fishing with "dry" flies. For the above purpose the assembly member is made of a material (preferably transparent) having a specific gravity just slightly heavier than water. Such an assembly body will travel just below the lake-surface when retrieved slowly. The wiry resilient hookleader emerges from the body in a transverse position as illustrated in the drawing. The inherent resiliency causes the emerging leader portion to curve toward and above the water-surface and thus the trailing leader portion and the attached "dry" fly or floating lure (not shown) on the trailing end of the leader can float on the water-surface while the casting weight is slightly below said surface. The trailing body portion and a transverse leader passageway therethrough thus constitute a leader directing means to direct the emerging leader portion upward. When the fishing weight rests on the bottom of a body of water, then a hook and lure on the end of a short wiry hookleader are held off bottom and above the fishing weight by the cooperation of said leader directing means with the inherent resiliency of said leader.

Different forms and sizes of the described casting weight, sinker or bobber and assembly body can be manufactured for the various fishing conditions and different fishing methods without departing from the scope of the invention.

With these and other objects in view, the invention consists in features of construction, combinations and arrangements of parts as will be hereinafter more fully described in detail, illustrated in the accompanying drawing which discloses the preferred embodiment of the invention, and pointed out in the claims hereunto appended.

Figure 1 is a top view of the combined assembly-member and fishing weight.

Figure 2 is a longitudinal mid-section through said assembly-body and shows the hookleader and the fishing line assembled therewith. The body is shown in retrieving position near the surface of a body of water with the emerging transverse leader portion protruding above the lake-surface.

Figure 3 is a bottom view of the same fishing weight.

Figures 4 and 5 are cross sections of the body, taken as indicated by the arrows, lines and corresponding numerals in Figure 2.

Figure 6 is a fragmentary longitudinal mid-sectional view through the leading end of the assembly-body, but showing an optional leader retainer adapted for quick leader changes.

In Figures 1 through 6 of the drawing the numeral 11 indicates the body of a combined fishing weight and assembly member for a fishing line 12 and for a flexible single strand hookleader or snell 13 with a looped end 14 on the connective end thereof. A fish-hook and lure (not shown) is secured to the other end of the leader 13, which is always trailing the fishing weight 11 during casting and retrieving. The assembly body has a line attaching means, in the form of an aperture 15, disposed at the normal leading end of the body 11 to tie the end of a fishing line 12 thereto, as illustrated in Figure 2 of the drawing. The body also has a transverse leader passageway 16 formed therein. The latter extends through the body from its bottom-side to its top-side and is adapted to receive a connective portion 13a of the hookleader. An extended portion 18 of the leader passageway extends lengthwise to the leading end of the body in the form of an open slot or groove 18, as illustrated. A leader retaining means 19 is associated with the bottom portion of the leader passageway. In the form illustrated in Figure 2 the passageway extension 18 communicates with the line aperture 15 through said groove 18. The connective end 13a of the hookleader can be tied directly to the leading end of the body through the line aperture 15 or a leaderloop 14 formed by the connective end of the leader can be secured to the body by passing the fishing line 12 therethrough and tying the latter to the leading end of the fishing weight, as illustrated. A modified form of leader retaining means 20 is shown in Figure 6. A leader retainer 21 is provided on the body intermediate the line aperture 15 and the lower end of the transverse passageway. Said leader retainer is formed by a wire member 22, a portion of which is embedded in the body as shown. A protruding wire portion forms a hook and saddle 21 adapted to have the looped end 14 of the hookleader in the passageway hooked thereto and unhooked therefrom. This makes it convenient to change hookleaders quickly. The connective leader portion 13a emerges from the top of the passageway 16 and body 11 in a transverse direction relative to the leading and trailing body ends. The passageway 16 circum-restricts the inserted leader portion near the top-side of the body and constitutes a leader directing means which directs the emerging leader portion upward. The comparatively long remainder of the hookleader normally trails behind the body with a hook and lure on the end thereof. If the fishing weight is made of material having generally the specific gravity of water then the top of the casting weight will float about flush with the surface of a body of water. If the specific gravity of the fishing weight is slightly heavier than water, then the fishing weight will sink slightly below said water surface 25, as illustrated in Figure 2. The specific gravity of transparent plastic material changes somewhat with the water absorption thereof. The drag and the upward tension of the fishing lure line prevents the fishing weight from sinking too deep during slow retrieving of the weight and connected lure. Thus the emerging portion of the wiry resilient hookleader 13 will protrude above the lake-surface 25 and consequently the floating lure on the trailing end of the leader will not be pulled down into the water or below its surface when the fishing weight is retrieved slowly. The body surface which forms the bottom of the passageway extension 18 also forms a lengthwise convex curved bending form 24 intermediate the leader retaining means 19 and that end of the passageway 16 where said remainder of the leader emerges. The trailing end of the bending form blends into the body-surface which forms the transverse passageway. The curve of the bending form 24 generally matches the curve formed by the connective leader portion 13a when the latter is relaxed and free of leader tension from the trailing remainder of the hookleader 13. The drag exerted on the trailing portion of the hookleader 13 during casting and retrieving tends to pull the retained connective leader portion 13a against the bending form. A leaderloop 14 which is hooked to the leader retainer 21 shown in Figure 6 is held against the bottom and seat of said hook and saddle by the resiliency of the bent hookleader portion 13a which tends to return to its original straight form. A keeper 26 bridges the passageway extension to keep the connective leader portion in the groove when there is no leader drag. It is understood that this keeper 26 may be omitted without departing from the scope of the invention.

While I have described my invention in detail in the present preferred embodiments, it will be obvious to those skilled in the art that various changes and modifications may be made therein without departing from the spirit or scope thereof. I aim in the appended claims to cover such modifications and changes to the best of my ability.

What I claim is:

1. A combined fishing weight and assembly member for a fishing line and a wiry flexible hookleader such as a snell, comprising a body having a line attaching means disposed at the normal leading end thereof to secure the end of the fishing line thereto, said body also having a transverse leader passageway formed in the trailing end portion thereof, said leader passageway extending through the body from its bottom-side to its top-side and being adapted to receive and circum-restrict a connective portion of the hookleader in such a manner that the latter emerges from said top-side with the remainder of the hookleader normally trailing behind the body, a lure on the end of said leader, a leader retaining means provided on the leading end of the body being adapted to have the connective end of the hookleader in the passageway secured thereto, the body being formed with a substantially triangular shaped cross-sectional configuration with the upper surface of the body constituting the base of the triangle, the intermediate bottom portion of the body being so shaped as to provide a convexly curved bending form, said bending form extending lengthwise from a point near the leader retaining means generally to said transverse leader passageway and blending into the latter, the curve of said bending form generally matching the curve formed by the relaxed connective leader portion.

2. A combined fishing weight and assembly member as set forth in claim 1 wherein the body has a specific gravity slightly greater than water and thus tends to sink very slowly a slight distance below the surface of a body of water with the emerging leader portion protruding upward from the body to a point above the water-surface.

3. A combined fishing weight and assembly member for a fishing line and a wiry flexible hookleader such as a snell, comprising a body having a line attaching means disposed at the normal leading end thereof to secure the end of a fishing line thereto, said body also having a transverse leader passageway formed in the trailing end portion thereof, said leader passageway extending through the body from its bottom-side to its top-side and being adapted to receive and circum-restrict a connective portion of the hookleader in such a manner that the latter emerges from said top-side with the remainder of the hookleader normally trailing behind the body, a lure on the end of said leader, said hookleader having a leaderloop formed by the connective end thereof, a leader retaining means incorporated at the leading portion of the body substantially forming a combined hook and saddle adapted to have said leaderloop connected thereto, the body being formed with a substantially triangular shaped cross-sectional configuration with the upper surface of the body constituting the base of the triangle, the intermediate bottom portion of the body being so shaped as to provide a convexly curved bending form, said bending form extending lengthwise from a point near the leader retaining means generally to said transverse leader passageway and blending into the latter, said connective hookleader portion being bent over said bending form and said leaderloop being held against the bottom of said hook and saddle of the leader retaining means by the inherent wiry resiliency of the bent hookleader portion.

4. A combined fishing weight and assembly member as set forth in claim 3 wherein the body has a specific gravity slightly greater than water and thus tends to sink very slowly a slight distance below the surface of a body of water with the emerging leader portion protruding upward from the body to a point above the water-surface.

5. A combined fishing weight and assembly member for a fishing line and a wiry flexible hookleader, comprising a body having a line attaching means and a leader retaining means provided at the leading end-portion thereof to secure the ends of the fishing line and hookleader thereto, respectively, the connective end of the hookleader having a leader-loop formed therein, said leader retaining means being so shaped as to form a combined hook and saddle adapted to have said leader-loop connected thereto, the body being formed with a substantially triangular shaped cross-sectional configuration with the upper surface of the body constituting the base of the triangle, said body also having a leader passageway formed therein, one end of said passageway extending through the trailing body portion from its bottom-side to its top-side and being adapted to receive and circum-restrict a connective portion of the hookleader, in such a manner that it will emerge from said top-side with the remainder of the hookleader normally trailing behind the body, a hook and lure on the free end of said leader, the remainder of said passageway having the form of an open slot running toward said leader retaining means in the bottom-portion of the body, said passageway-slot being so shaped that the bottom thereof forms a curved bending form for the hookleader, said leader-loop being held against the bottom and seat of said leader retaining means by the inherent resiliency of that hookleader-portion which is bent over said bending form.

6. A combined fishing weight and assembly member as set forth in claim 5 wherein the body has a specific gravity slightly greater than water and thus tends to sink slowly a slight distance below the surface of a body of water with the emerging leader portion protruding upward from the body to a point above the water-surface.

7. A combined fishing weight and assembly member for a fishing line and a wiry flexible hookleader, comprising a body having a line attaching means and a leader retaining means provided at the leading end-portion thereof to secure the ends of the fishing line and hookleader thereto, respectively, the connective end of the hookleader having a leader-loop formed therein, said leader retaining means being so shaped as to form a combined hook and saddle adapted to have said leader-loop connected thereto, said body having a generally flat top-surface adapted to lay generally flush and parallel with the surface of a body of water, the body also having a leader passageway formed therein, one end of said passageway extending through the trailing body portion from its bottom-side to its top-side and being adapted to receive and circum-restrict a connective portion of the hookleader, in such a manner that it will emerge from said top-side with the remainder of the hookleader normally trailing behind the body, a hook and lure on the free end of said leader, the remainder of said passageway having the form of an open slot running toward said leader retaining means in the bottom-portion of the body, said passageway slot being so shaped that the bottom thereof forms a curved bending form for the hook-leader, said leader-loop being held against the bottom and seat of said leader retaining means by the inherent resiliency of that hookleader-portion which is bent over said bending form.

8. A combined fishing weight and assembly member as set forth in claim 7 wherein the body has a specific gravity slightly greater than water and thus tends to sink slowly a slight distance below the surface of a body of water with the emerging leader portion protruding upward from the body to a point above the water-surface.

9. A combined fishing weight and assembly member for a fishing line and a wiry flexible hookleader, comprising a body having a line attaching means and a leader retaining means provided at the leading end portion thereof to secure the ends of the fishing line and hookleader thereto, respectively, said body being formed of such a configuration as to have a generally flat top-surface and a rounded belly on the bottom, the body also having a leader passageway formed therein, said pasageway extending through the trailing body-portion from the belly-side to its top-side and being adapted to receive and circum-restrict a connective portion of the hookleader with the hookleader emerging transversely and upwardly from the top-side of the casting weight, the free remainder of the hookleader being comparatively short and having a hook and lure on the free end of said leader, the surface of said rounded belly being formed to provide a combined passageway and bending form for that leader portion which runs from said leader retaining means to the transverse leader passageway in the trailing body-portion, the trailing body-portion and the transverse passageway therethrough constituting a leader directing means for the emerging leader portion, and the inherent wiry resiliency of the hookleader cooperating with said leader directing means to hold the hook and lure above the fishing weight when the latter rests on its belly on the bottom of a body of water.

References Cited in the file of this patent

UNITED STATES PATENTS

| | | |
|---|---|---|
| 399,866 | Gage | Mar. 19, 1889 |
| 685,263 | Decor | Oct. 29, 1901 |
| 1,226,403 | Snyder | May 15, 1917 |
| 1,361,602 | Marks | Dec. 7, 1920 |
| 1,497,019 | Hennings | June 10, 1924 |
| 1,543,206 | Doering | June 23, 1925 |
| 2,043,817 | Stuck | June 9, 1936 |
| 2,492,033 | Cherriere | Dec. 20, 1949 |
| 2,572,616 | Hansen | Oct. 23, 1951 |
| 2,572,790 | West | Oct. 23, 1951 |
| 2,710,479 | Gehrig | June 14, 1955 |